Jan. 19, 1954            J. M. WILSON            2,666,247
MOLD FOR MOLDING CONCRETE BLOCKS

Filed Jan. 30, 1951                                        6 Sheets-Sheet 1

Inventor:
JOHN MILLAR WILSON
By
Richardson, David and Nordon
Attorneys

Jan. 19, 1954  J. M. WILSON  2,666,247
MOLD FOR MOLDING CONCRETE BLOCKS
Filed Jan. 30, 1951  6 Sheets-Sheet 2

Inventor:
JOHN MILLAR WILSON
By Richardson, David and Nordon
Attorneys

Jan. 19, 1954 J. M. WILSON 2,666,247
MOLD FOR MOLDING CONCRETE BLOCKS
Filed Jan. 30, 1951 6 Sheets-Sheet 4

Inventor:
JOHN MILLAR WILSON
By Richardson, David and Nordon
Attorneys

Jan. 19, 1954  J. M. WILSON  2,666,247
MOLD FOR MOLDING CONCRETE BLOCKS
Filed Jan. 30, 1951  6 Sheets-Sheet 5

Inventor:
JOHN MILLAR WILSON
By Richardson, David and Nordon
Attorneys

Jan. 19, 1954

J. M. WILSON

2,666,247

MOLD FOR MOLDING CONCRETE BLOCKS

Filed Jan. 30, 1951

Inventor:
JOHN MILLAR WILSON

By Richardson, David and Nordon
Attorneys

Patented Jan. 19, 1954

2,666,247

UNITED STATES PATENT OFFICE 2,666,247

MOLD FOR MOLDING CONCRETE BLOCKS

John M. Wilson, Glasgow, Scotland

Application January 30, 1951, Serial No. 208,517

Claims priority, application Great Britain
January 30, 1950

7 Claims. (Cl. 25—121)

This invention relates to composite multiple moulds for moulding a plurality of concrete blocks, of the type comprising a plurality of separate bottom members, side or division members, and end members adapted to be successively and removably assembled together in order automatically to position correctly and support each other in mould formation.

Hitherto such moulds have been constructed of wood and, due to the stresses and dampness associated with the moulding of concrete blocks, the wooden surfaces in contact with the concrete have been subject to localised warping. As a result of this warping, the concrete blocks produced have not been true i. e., those surfaces thereof adapted to be united to one another during building have not been truly vertical and horizontal and, consequently, much time has been lost in "trueing up" during subsequent building operations.

An object of the present invention is to obviate or mitigate this disadvantage.

In accordance with the present invention all the members of the mould are formed of metal, the bottom members and the side or division members being each adapted for successive positioning, bottom and side members alternating, during assembly of the mould, transversely across a base comprising spaced, parallel longitudinals, each extreme or outer side member being provided with recess and/or projection means in or on depending parts thereof adapted for positive locking engagement with cooperating projection and/or recess means provided on or in the longitudinals, and the end members being adapted to be located between ends of adjacent side or division members and to be positioned by locating formations on said ends, thereby positively locating said side or division members in truly vertical positions, and rigidifying the mould assembly.

Preferably, the intermediate side members of the mould are provided with dependent guide means to facilitate initial positioning thereof on the longitudinals.

An embodiment of the invention will now be described by way of example, with reference to the accompanying drawing in which.

Figure 1:
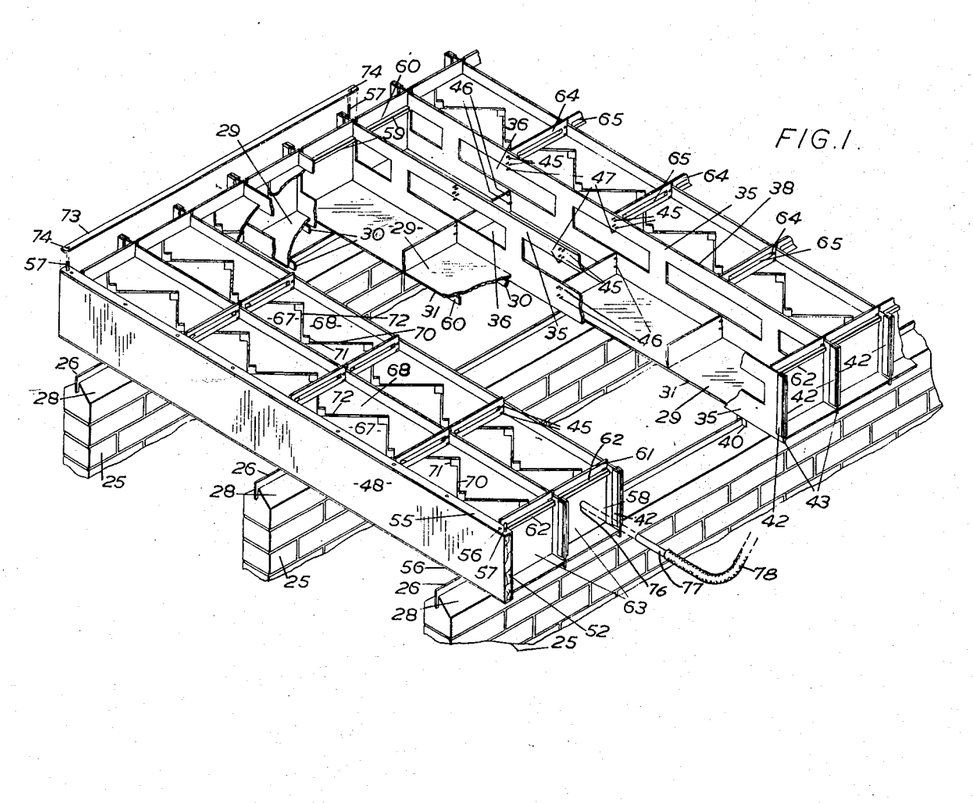
Fig. 1 is an isometric view of a composite multiple mould for moulding double-walled concrete blocks.

Referring to the drawings, the composite multiple mould for moulding double-walled blocks comprises a base formed by three equi-spaced, parallel, longitudinal runners 25 whereof the length is restricted only by the amount of space available. The runners 25 are permanently fixed in a truly horizontal position, and each runner is provided with a central pressed-metal blade member 26 stretching continuously along the length thereof and permanently secured thereto in a truly vertical position. Each blade member 26 is provided with a truly vertical slot 27 opening from the upper horizontal edge adjacent each end thereof.

The three slots 27 at each end of the base register with one another horizontally in a direction transversely of the blades. The runners 25 may, for instance, be of concrete and the blade members 26 be embedded therein. The upper surface of each runner slopes downwardly away from the blade member to each side thereof as indicated at 28.

A plurality of bottom members 29 (Fig. 3) are provided, each comprising a rectangular, pressed metal sheet, the breadth of which is equal to the height of the blocks to be moulded, and the length of which is a little greater than the aggregate widths of four blocks. Both surfaces of each bottom member are flat and smooth, but the underneath surface is provided with two spaced depending ridges 30, each of which is close to and parallel with one or other of the longer edges 31 of the sheet. The ridges 30 do not extend the full length of the bottom member but stop a little short of each end thereof. The ends of the ridges abut two transverse depending ribs 32 which are parallel to one another and to the shorter edges 33 of the sheet. The ribs 32 are spaced a little inwardly from the ends of the sheets, and extend the full width of the latter.

Figures 2, 3:
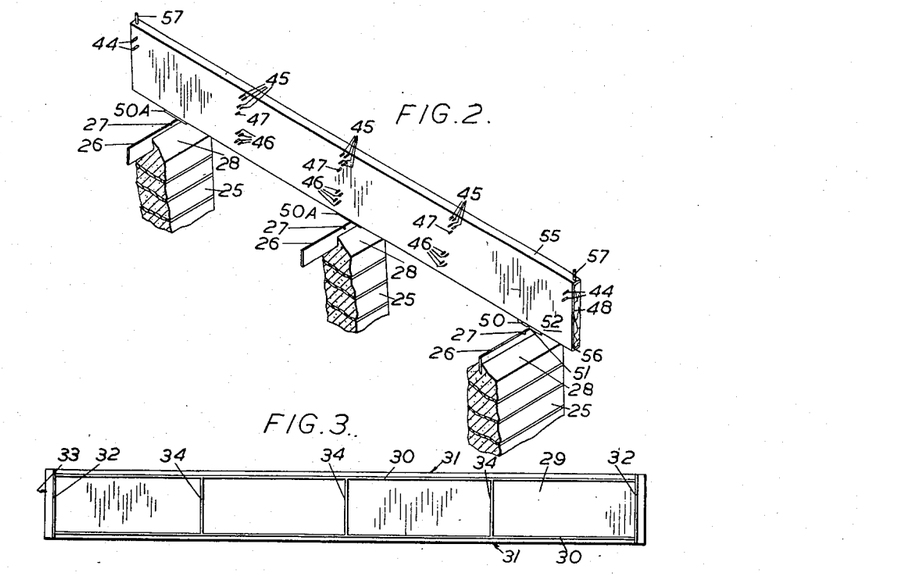
Fig. 2 is an isometric view illustrating the first step in erecting the mould.
Fig. 3 is a reverse plan view of a bottom member of the mould.

Three intermediate transverse depending ribs 34 are also provided and extend between the ridges 30 at equi-spaced intervals therealong. The ridges 30 and ribs 32 and 34 strengthen the bottom members 29. The ridges 30 and ribs 32 and 34 are preferably formed integrally with the sheets, although they may be otherwise secured thereto, for example by welding.

A plurality of division or side members 35 (Figs. 4 and 5) are also provided, each side member 35 comprising a rectangular, pressed-metal sheet whereof both surfaces are flat. The breadth of the rectangular sheet is equal to the total depth of the blocks to be moulded and the length thereof is a little greater than the length of the bottom members 29 above described.

Figure 4:
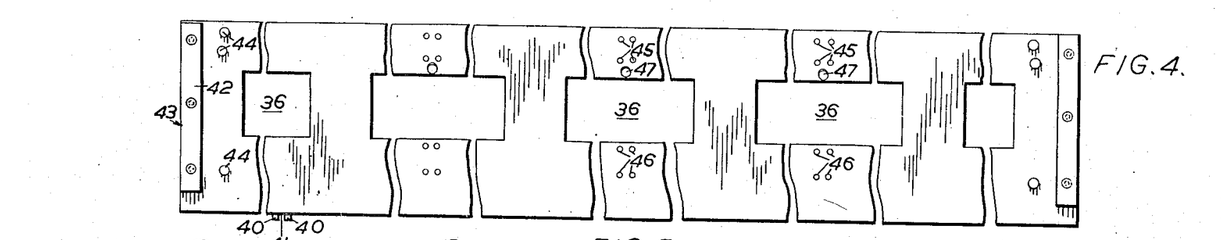
Figs. 4 and 5 are, respectively, a front elevation and a plan view of a division or side member of the mould.
Figures 5, 6, 7, 8:
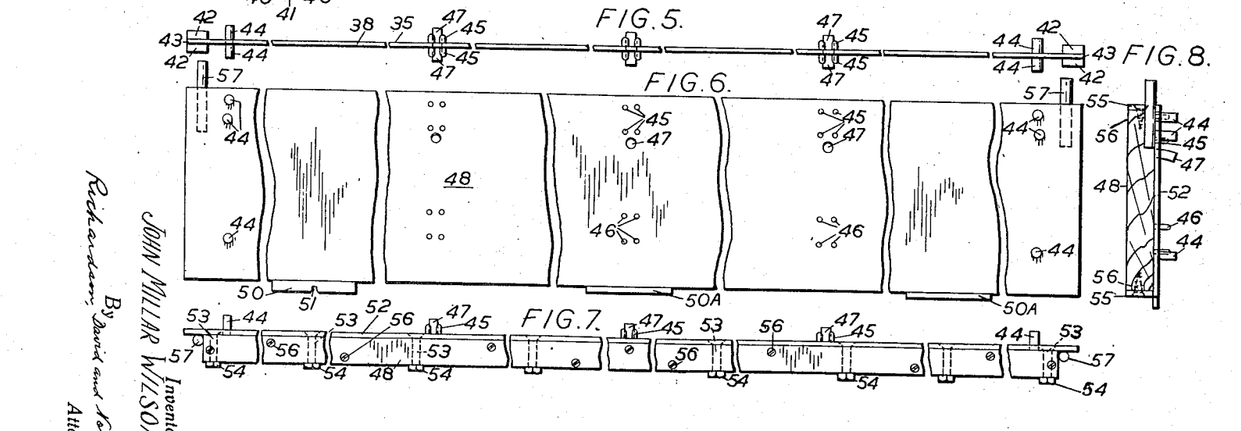
Figs. 6, 7 and 8 are, respectively, a front elevation, a plan view, and an end elevation of an extreme or outer side member of the mould.

Each sheet is provided with a series of spaced apertures 36 lengthwise thereof intermediate its breadth, the distance between each of the longer edges 37 and 38 of the side member and the adjacent peripheries 39 of said apertures 36 being at least equal to the thickness of the walls of the blocks to be moulded.

Two depending lugs or projections 40 are provided on the lower edge 37 of each side or division member 35 towards one end thereof. The lugs 40 are spaced apart to define a recess or notch 41 into which an outer one of the blade members 26 is adapted to enter with a sufficient clearance to allow movement of the side members in the direction of the blades when the former is positioned upon the latter in the mould assembling and dismantling operations. A rectangular metal bar 42, of length a little less than the length of the shorter edges 43 of the side members, is riveted or welded into position adjacent each shorter edge 43 (hereinafter referred to as the "ends") of each side member 35 and on both surfaces thereof. The metal bars extend from closely adjacent the top edges 38 of the side members and stop a little distance short of the lower edges 37 thereof.

Three small studs 44 project outwardly from each surface of each side member towards each end thereof, and are located a little inwardly of the metal bars 42. Two of the studs of each set are located at the upper part of the side member and the other is located at the lower part thereof. The two outermost studs are in vertical alignment and the intermediate stud is positioned slightly closer to the adjacent metal bar 42 than are the outermost studs. These studs 44 which are adapted to be engaged by end members 58 to be hereafter described, are located on each surface of each side member and are equally spaced therealong. Three guide means are provided on each surface, and each comprises two series of small studs 45, 46 which project outwardly from the surface of the side member 35 and which are parallel to one another and to the shorter edges 43 of the side member. A gap equivalent to the space between the two walls of the double-walled blocks to be moulded, is provided in each guide means, so that, in effect, each guide means comprises two spaced parts (hereinafter referred to as "upper" and "lower" guide means 45 and 46 respectively). A further series of studs 47, for supporting upper deck plates 67, 68 hereinafter described, is provided on each surface of each side member 35. Each series of moulding plate supporting studs 47 is parallel to the top edge 38 of the side member 35 and is located at a distance therefrom equivalent to the thickness of one of the walls of each block to be moulded.

Two outer or extreme side members 48 (Figs. 6, 7 and 8) are provided, which are similar in shape to the intermediate side or division members 35 but have no apertures therein. Each extreme side member (Figs. 6, 7 and 8) comprises a wooden board to the front or inner surface of which a metal plate 52 is secured by bolts 53 and nuts 54 at spaced intervals. Metal strips 55 are secured along the upper and lower edges of the board by screws 56 spaced therealong. A pin 57 is secured in position at each end of the member 48 to project upwardly therefrom. A vertical downwardly-extending projection 50 is provided on the lower edge of the plate 52 towards one end thereof, and two further vertical downwardly-extending projections 50A are also provided on said lower edge at spaced locations therealong. The spacing of the projections 50 and 50A corresponds to the spacing of the longitudinal runners 25. The depth of the projections 50A corresponds to the depth of the slots 27 in the blades 26 and the depth of the projection 50 is somewhat greater than that of the slots 27. A notch 51 is provided in the lower edge of the projection 50 and extends upwardly therein to a level in alignment with the lower edges of the projections 50A. The width of the notch 51 is such that the blade 26 is a sliding fit therein. The notch is preferably rounded on both sides at its outer end as shown to facilitate fitting of the extreme side member on the blades 26.

Figure 9:
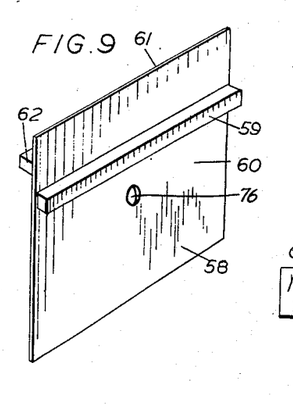
Figs. 9, 10 and 11 are, respectively, a perspective view, an end elevation and a plan view of an end member of the mould.
Figure 10:
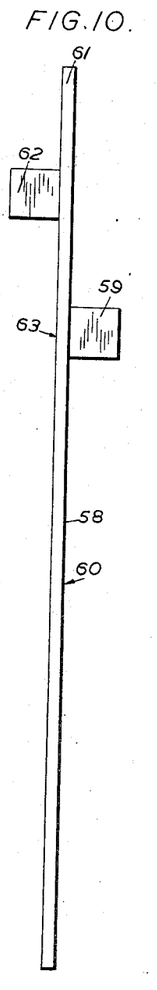
Figure 11:
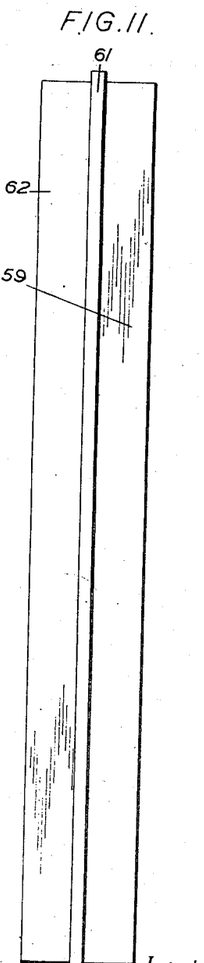

A plurality of end members 58 (Figs. 9 to 11) are also provided, and each comprises a rectangular pressed-metal sheet, flat on both surfaces. Each end member 58 is of the same breadth as the bottom members and of length equivalent to the total thickness of the blocks to be moulded. A metal ledge 59 is provided on one surface 60 of each end member (hereinafter referred to as the "inner surface") said ledge 59 projecting outwardly from said surface and being parallel to the top edge 61 thereof, the distance of said ledge 59 from said top edge 61 is equal to the distance of the series of moulding plate supporting studs 29 from the top edge 21B of each side member. Each ledge 59 extends the full breadth of the end member 58. A metal bar 62 is provided on the outer surface 63 of each end member 58 near the top 61 thereof and extends parallel to said top 61 and the full width of the member 58.

A plurality of upper and lower individual mould separating members 64 and 66 respectively, are provided for the multiple mould.

Figure 12:
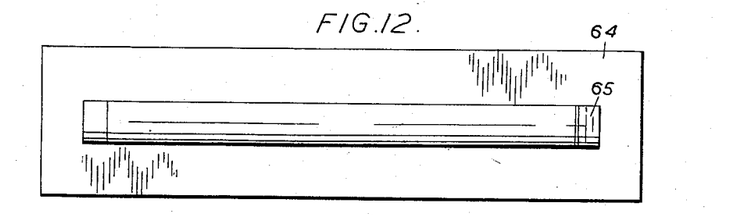
Figs. 12, 13 and 14 are, respectively, a front elevation, a plan view, and a section of an upper separating member of the mould.
Figures 13, 14:
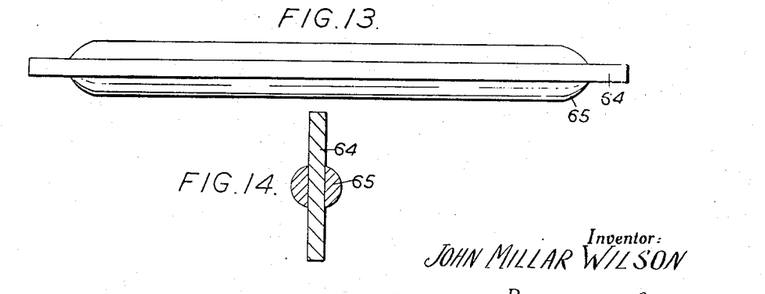

Each upper separating member 64 (Figs. 12, 13 and 14) comprises a rectangular metal plate of length equivalent to the width of a bottom member 29, and of width equivalent to the depth of the outer wall of the double-walled block produced in the mould (the wall which is uppermost in the moulding operation). Projecting strips 65 are provided on each side of the member 64 as shown in order that the building block will be moulded with channels or grooves in each end of its outer wall, but the strips 65 may, if desired, be dispensed with.

Figure 15:
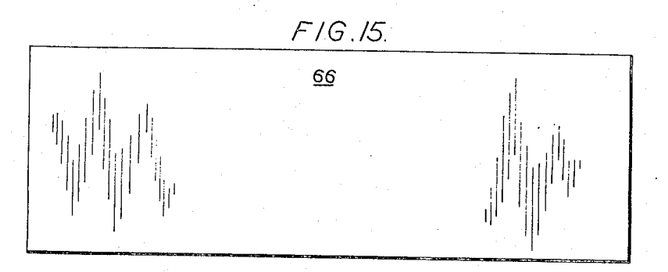
Figs. 15, 16 and 17 are, respectively, a front elevation, a plan view, and a vertical section of a lower separating member of the mould.
Figure 16:
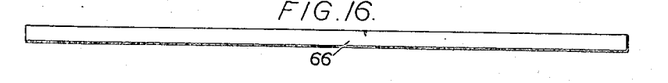
Figure 17:
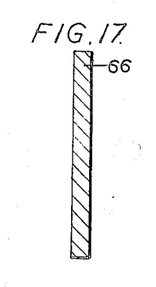

Each lower separating member 66 (Figs. 15 to 17) comprises a rectangular metal plate of length equivalent to the width of a bottom plate and width equivalent to the depth of the inner wall of the block produced in the mould (the wall which is lowermost in the moulding operation).

Figure 18:
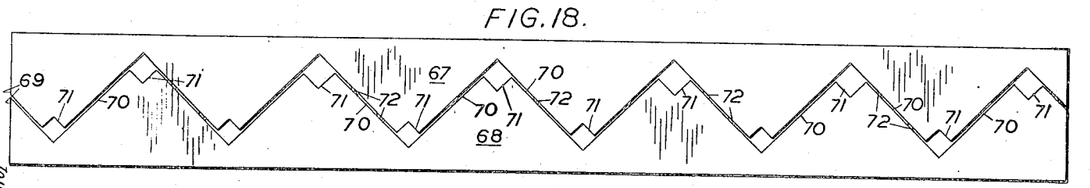
Figs. 18 and 19 are, respectively, a plan view and a side elevation of an upper deck plate of the mould.
Figure 19:
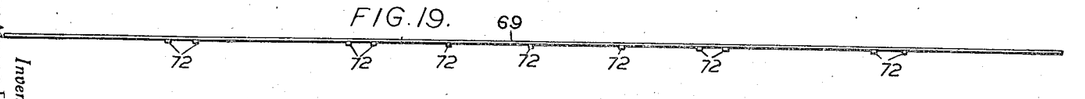

Finally a plurality of deck plates 67, 68 (Figs. 18 and 19) are provided for insertion into the composite multiple mould at an intermediate stage in the moulding of double-walled blocks. The deck plates 67, 68 are also of pressed metal and of rectangular construction the dimensions thereof being such that they bridge the space between two end members 58 and two side members 36 when the composite mould is built up. The deck plates are each formed of two mating half-plates 67 and 68 to facilitate passage therethrough of ties. The moulding plates are cut along a line extending between the mid points of its two shorter edges 69. This line is of a zig-zag nature, and the apices of the zig-zag edge 70 of each half-plate 67 and 68 have each a cut-away portion 71 to allow insertion of a tie between said cut-away portion and the adjoining trough or recessed part of the mating half-plate. Small projecting lugs 72 are provided at intervals along the mating edges 70 of one or both of the two half-plates 67 and 68, said lugs being welded to the lower surfaces of said half-plates, and being adapted to engage under the lower surface of the mating half-plate to assist in supporting same.

In assembling the composite multiple mould, an outer or extreme side member is firstly positioned adjacent one end of the base with the projections 50 and 50A coinciding with the slots 27 in the blade members 26 (see Fig. 2). The notch 51 in the projection 50 engages over the appropriate outer blade member below the slot therein and prevents movement of the extreme side member in the direction of its length, while the slots in the blades prevent movement of the extreme side member in a direction transverse to its length. The extreme or outer side member is thus positively positioned truly vertically on the base transversely of the blade members 26. A bottom member 29 is next positioned transversely across the blade members 26 with one of its longer edges contacting the inner face 52 of the outer side member 48 and its ridges 30 contacting the blade members. An intermediate side or division member 35 is next positioned across the blade members adjacent the bottom member. The side member is located relatively to the blade members 26 by the notch or recess 41 (see Fig. 1) engaging over an outer one of the blade members 26. The side member is then slid along the blade members into contact with the bottom member already positioned. Thereafter bottom members 29 and side members 35 are successively positioned, bottom and side members alternating, along the length of the base, and finally another extreme side member is positioned at the opposite end of the base. To assist in the initial positioning of the side and bottom members, the fifth side member from each end of the mould is provided at each of its ends in like manner to the extreme side members, with an upstanding pin 57, and the pins 57 on the extreme and intermediate side members at each end of the mould are interconnected by tie rods 73 provided with eyes 74 adapted to pass over the pins 57.

At this stage, the surfaces of the bottom members 29 are truly horizontal but the side or division members 35 may be inclined a little to one side or other of the vertical.

End members 58 are then positioned along the length of the multiple mould on each side thereof. Each end member is positioned between two successive side members 35 with its inner surface 60 facing inwardly and its lower edge resting on the bottom member 29 thereat. The positioning of the end members is commenced from one end of the multiple mould, that is the first end member to be positioned is located between one of the two extreme side members 48 and an intermediate side member 35 and thereafter the end members are positioned successively along the length of the multiple mould. Initially the end members are tilted inwardly towards the centre line of the mould with their outer surfaces contacting the lowermost of the studs 44 on the side members. The end members are then knocked outwardly at their upper edges and the bars 62 on the outer surfaces 63 thereof engage between the two uppermost studs 44 on the side members. When all of the end members 58 are in position, they and the side members 35 are truly vertical.

Figure 20:
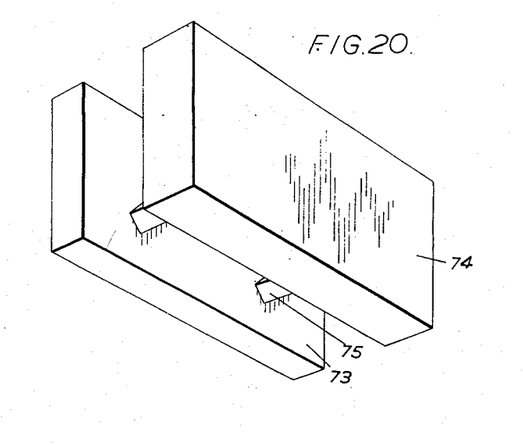
Figs. 20 and 21 are, respectively, a perspective view from below and a plan view of a double-walled concrete block of the type produced in the mould illustrated in Figs. 1 to 19 inclusive of the drawings.
Figure 21:
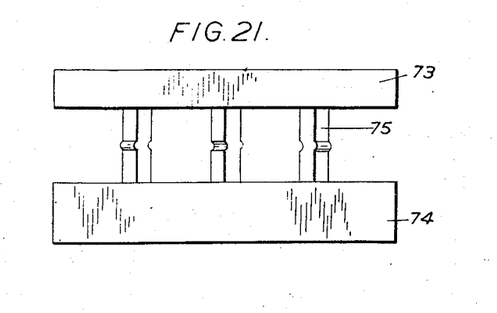

The multiple mould at this stage comprises a plurality of rows of mould spaces stretching transversely across the mould. Each of these rows of mould spaces are adapted to contain four individual moulds as shown in Fig. 1. The individual moulds are formed in each row and double-walled building blocks formed therein as follows:

Three lower separating members 66 are positioned in the bottom of the mould space between the two side members thereat and each is positively located in a truly vertical position by the lower guide means 46 on each of the side members. The four moulds in each row are now ready to receive the concrete, cement or the like mix to form the inner walls 74 of the blocks shown in Figs. 20 and 21. The concrete or the like mix is poured into the individual mould bottoms and scraped off level with the tops of the lower separating plates 66.

Next deck plates 67, 68 are positioned in each row and extend between the opposed end plates and the opposed side plates. The deck plates are supported at each end upon the bars 59 on the inner surfaces of the end plates and at each side on the studs 47 on the side plates. The ties 75 of the blocks are then passed through the spaces between the cut-away portions 71 and adjoining trough or recessed part of the mating half-plates. The ties 75 are pre-cast and are formed of concrete or the like reinforced by a longitudinally-extending metal rod or wire embedded therein. The length of the ties are such that they can be forced into the concrete or the like mix forming the wall 74 to a depth at least equivalent to three-quarters of the depth of the wall and project upwardly from the deck an amount at least equivalent to three-quarters of the depth of the upper wall 73 of the block which has yet to be formed.

Three upper separating plates 64 are now positioned in each row of the multiple mould and extend across each row between the opposed side members thereat. Each upper separating plate is positively located in a truly vertical position by the upper guide means 45 on each of the side members. The upper mould spaces thus formed are then filled with the concrete or the like mix which is scraped off level with the tops of the upper separating plates 64 to form the outer walls 73 of the blocks. The outer wall of the block shown has not the recessed feature in its ends which would be formed by the strips 65 on the upper separating plates 64 but the block shown would be produced in the mould if flat surface upper separating plates 64 were used.

The blocks thus moulded are allowed to set and the mould is then disassembled by removing the tie rods 73 at one end thereof and lifting off the extreme side member 48 at that end. The adjacent half-plate 67 or 68 is then withdrawn and the four double-walled blocks which are exposed can be removed. The two end members 58, the mating half-plate and the six upper and lower separating plates 64 and 66 are then removed and the same procedure is followed for removing the next four double-walled blocks and so on.

The two mating half-plate parts 67 and 68 forming the deck plate may have other than zig-zag mating edges. Such edges may, for instance, be of an undulating or waved formation; or they may be adapted to interlock.

The various members of the mould above described do not readily warp or buckle in use and have therefore a longer life than the usual wooden members. Moreover, the blocks formed in the mould have true vertical and horizontal surfaces, thereby greatly facilitating the erection of walls, etc.

Openings 76 are provided centrally in several of the end members to allow passage therethrough of tubes 77 to which are attached flexible pipes 78 through which steam may be introduced to speed up setting of the blocks. The members of the mould are preferably formed of bright steel of gauge one eighth of an inch. The members are therefore flexible, although the transverse depending ridges on the bottom members lend the necessary rigidity thereto. The side and end members remain flexible when the mould is being built up, and the mould is not rigidified until the last end member is knocked into position. The action of knocking the final end member into position has the effect of "trueing up" the entire series of side or division members of the mould.

While the invention has been described with reference to a mould for moulding double-walled blocks, it is, of course, likewise applicable to moulds for moulding single-walled and other blocks.

I claim:

1. A composite multiple mould for moulding concrete blocks comprising a plurality of spaced longitudinally-extending blade members disposed in parallel vertical planes with their upper edges horizontal and uniplanar, each blade member having therein at two longitudinally-spaced-apart points a notch which extends downwardly in a vertical direction from the upper edge of the blade member, each notch in each blade member being identical to and in transverse alignment with the corresponding notches of the other blade members; two extreme side members positioned transversely across the blade members and having plane inner surfaces; downwardly-extending projection means at the lower edge of each extreme side member engaging in the notches of one of the series of transversely-aligned notches to lock the extreme side members against displacement longitudinally of the blade members in positions whereat the inner surfaces of said members face each other and occupy vertical planes; means locking said extreme side members against transverse displacement relative to the blade members; a plurality of horizontal bottom members located transversely across the blade members between the extreme side members and forming the bottoms of individual rows of moulds; a plurality of vertical division members positioned transversely across the blade members between adjacent bottom members and separating the individual rows of moulds; means locating the lower edges of the division members against transverse movement relative to the blade members; a plurality of vertical end members located one at each end of the individual rows of moulds to close said ends; interengaging means on the division and end members positively locating said members relative to one another; vertical separating plates separating the moulds of the individual rows of moulds; and means on said division plates positively locating said separating plates.

2. A composite multiple mould as claimed in claim 1, in which the blade members are permanently mounted at some height above ground level on spaced, parallel longitudinally-extending walls, the lower edges of the blade members being embedded in the upper parts of the walls to rigidify and reinforce the blade members.

3. A composite multiple mould for moulding concrete blocks comprising a plurality of spaced longitudinally-extending blade members disposed in parallel vertical planes with their upper edges horizontal and uniplanar, each blade member having therein at two longitudinally-spaced-apart points a notch which extends downwardly in a vertical direction from the upper edge of the blade member, each notch in each blade member being identical to and in transverse alignment with the corresponding notches of the other blade members; two extreme side members positioned transversely across the blade members and having plane inner surfaces; downwardly-extending projection means at the lower edge of each extreme side member engaging in the notches of one of the series of transversely-aligned notches to lock the extreme side members against displacement longitudinally of the blade members in positions whereat the inner surfaces of said members face each other and occupy vertical planes; said downwardly-projecting means having at least one notch engaging over a blade member to lock said extreme side members against transverse displacement relative to the blade members; a plurality of horizontal bottom members located transversely across the blade members between the extreme side members and forming the bottoms of individual rows of moulds; a plurality of vertical division members positioned transversely across the blade members between adjacent bottom members and separating the individual rows of moulds; means locating the lower edges of the division members against transverse movement relative to the blade members; a plurality of vertical end members located one at each end of the individual rows of moulds to close said ends; interengaging means on the division and end members positively locating said members relative to one another; vertical separating plates separating the moulds of the individual rows of moulds, and means on said division plates positively locating said separating plates.

4. A composite multiple mould for moulding concrete blocks comprising a plurality of spaced longitudinally-extending blade members disposed in parallel vertical planes with their upper edges horizontal and uniplanar, at least two of said blade members having therein at two longitudinally-spaced-apart points a notch which extends downwardly in a vertical direction from the upper edge of the blade member, each notch in each blade member being identical to and in transverse alignment with the corresponding notches of the other blade members; two extreme side members positioned transversely across the blade members and having plane inner surfaces; downwardly-extending projection means at the lower edge of each extreme side member engaging in the notches of one of the series of transversely-aligned notches to lock the extreme side members against displacement longitudinally of the blade members in positions whereat the inner surfaces of said members face each other and occupy vertical planes; means locking said extreme side members against transverse displacement relative to the blade members; a plurality of horizontal bottom members located transversely across the blade members between the extreme side members and forming the bottoms of individual rows of moulds; a plurality of vertical division members positioned transversely across the blade members between adjacent bottom members and separating the individual rows of moulds; means locating the lower edges of the division members against transverse movement relative to the blade members; a plurality of vertical end members, one positioned at each end of the individual rows of moulds to close said ends, interengaging means on the division and end members positively locating said members relative to one another; lower vertical separating plates separating the moulds of the individual rows of moulds; means on said division plates positively locating said lower separating plates; a plurality of horizontal deck plates, one mounted transversely across each individual row of moulds at some height above the bottom member thereof and having a plurality of through apertures therein; projection means on the division and end members supporting said deck plates; upper vertical separating plates separating the moulds of the individual rows of moulds above said deck plates; and means on said division plates positively locating said upper separating plates.

5. A composite multiple mould as claimed in claim 4, in which the deck plates comprise two mating half-plates and the through apertures are located along the mating edges of said half-plates.

6. A composite multiple mould as claimed in claim 4, in which at least some of the end members have an opening located therein at a height intermediate the upper level of the lower separating plates and the level of the deck plates.

7. A composite multiple mould for moulding concrete blocks comprising a plurality of spaced longitudinally-extending blade members disposed in parallel vertical planes with their upper edges horizontal and uniplanar, at least two of said blade members having therein at two longitudinally-spaced-apart points thereof a notch which extends downwardly in a vertical direction from the upper edge of the blade member, each notch in each member being identical to and in transverse alignment with the corresponding notches of the other members; two extreme side members positioned transversely across the blade members, and having plane inner surfaces; an upwardly-projecting pin at each end of each extreme side member; downwardly-extending projection means at the lower edge of each extreme side member and engaging in the notches of one of the series of transversely aligned notches to lock the extreme side members against displacement longitudinally of the blade members in positions whereat the inner surfaces of said extreme side members face each other and occupy vertical planes; means locking said extreme side members against transverse displacement relative to the blade members; a plurality of horizontal bottom members located transversely across the blade members between the extreme side members and forming the bottoms of individual rows of moulds; a plurality of vertical division members located transversely across the blade members between adjacent bottom members and separating the individual rows of moulds; an upwardly-projecting pin at each end of two division members, each one of which is spaced from one of the extreme side members; four tie rods each interconnecting the pin at an end of an extreme side member with the pin at the end of the nearest of the pin-carrying division members at the same end of the multiple mould; means locating the lower edges of the division members against transverse movement relative to the blade members; a plurality of vertical end members, one located at each end of the individual rows of moulds to close said ends; interengaging means on the division and end members positively locating said members relative to one another; vertical separating plates separating the moulds of the individual rows of moulds; and means on said division plates positively locating said separating plates.

JOHN M. WILSON.

References Cited in the file of this patent

UNITED STATES PATENTS

| Number | Name | Date |
|--------|------|------|
| 1,285,056 | Cutler | Nov. 19, 1918 |
| 1,312,631 | Hellstrom | Aug. 12, 1919 |
| 1,577,383 | Straub | Mar. 16, 1926 |
| 2,186,097 | Burns | Jan. 9, 1940 |